United States Patent [19]

Chastine

[11] Patent Number: 4,571,517
[45] Date of Patent: Feb. 18, 1986

[54] HERMETIC COMPRESSOR INCLUDING A TERMINAL BLOCK AND THERMAL PROTECTION RETAINER MEANS

[75] Inventor: Gary L. Chastine, Louisville, Ky.

[73] Assignee: General Electric Company, Louisville, Ky.

[21] Appl. No.: 660,647

[22] Filed: Oct. 15, 1984

[51] Int. Cl.$^4$ ............................................. H02K 11/00
[52] U.S. Cl. .................................. 310/68 C; 310/71; 361/22; 361/419
[58] Field of Search ...................... 310/68 R, 68 C, 71; 318/473; 174/17 CT, 17.08, 50.52, 52 R; 361/22, 25, 26, 27, 331, 334, 379, 380, 386, 388, 389, 417, 419, 427

[56] References Cited

U.S. PATENT DOCUMENTS

| 2,495,189 | 1/1950 | Stein et al. | 318/221 |
|---|---|---|---|
| 2,517,411 | 8/1950 | Patterson | 62/126 |
| 2,710,373 | 6/1955 | Crowell | 318/473 |
| 3,942,854 | 3/1976 | Klein et al. | 339/17 CF |
| 4,061,935 | 12/1977 | Kandpal | 310/68 C |
| 4,236,092 | 11/1980 | Di Flora | 310/68 C |
| 4,252,394 | 2/1981 | Miller | 310/68 C |
| 4,343,451 | 8/1982 | Armstrong | 248/500 |
| 4,390,219 | 6/1983 | Beehler | 339/14 R |
| 4,467,385 | 8/1984 | Bandoli | 361/27 |

Primary Examiner—G. P. Tolin
Attorney, Agent, or Firm—Frank P. Giacalone; Radford M. Reams

[57] ABSTRACT

In a hermetic compressor there is provided a resilient retainer member adapted to removably secure a terminal receptacle block assembly and a thermal overload protector relative to the compressor casing. The receptacle block assembly is adapted to engage conductor pins of an electrical terminal secured to the upper wall of the casing while the overload protector is adapted to engage the upper wall of the casing. The retainer member includes a first leg portion dimensioned to engage the thermal overload protector and a second leg portion dimensioned to engage the terminal receptacle block whereby downward pressure on the retainer member secures both the overload protector and terminal receptacle block relative to the casing.

7 Claims, 5 Drawing Figures

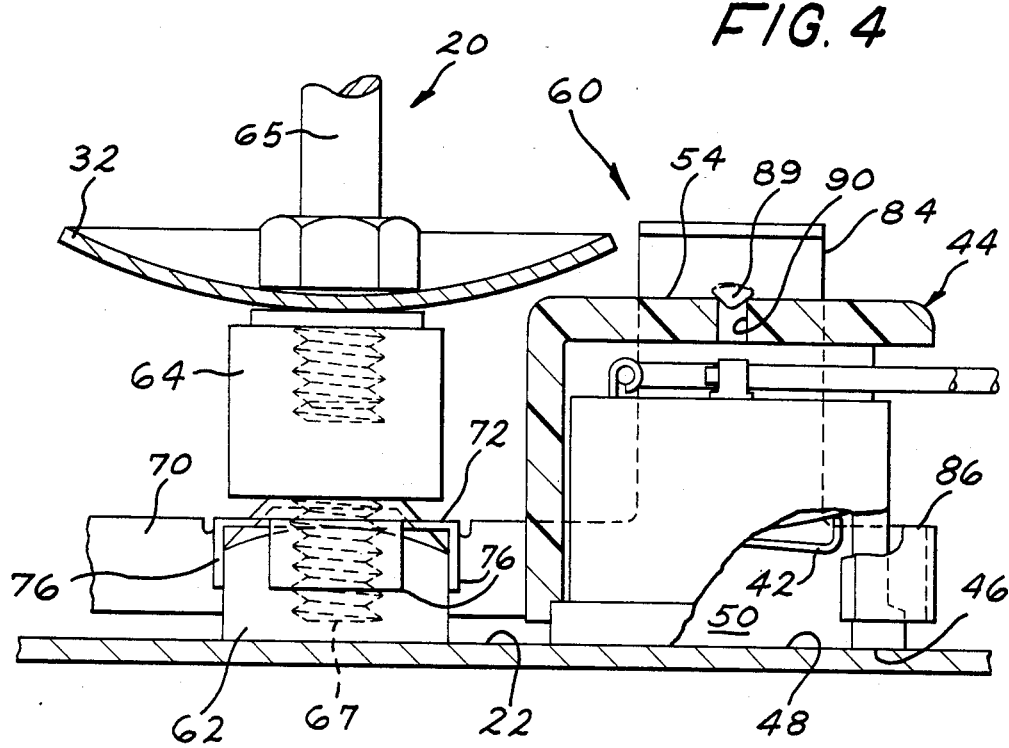
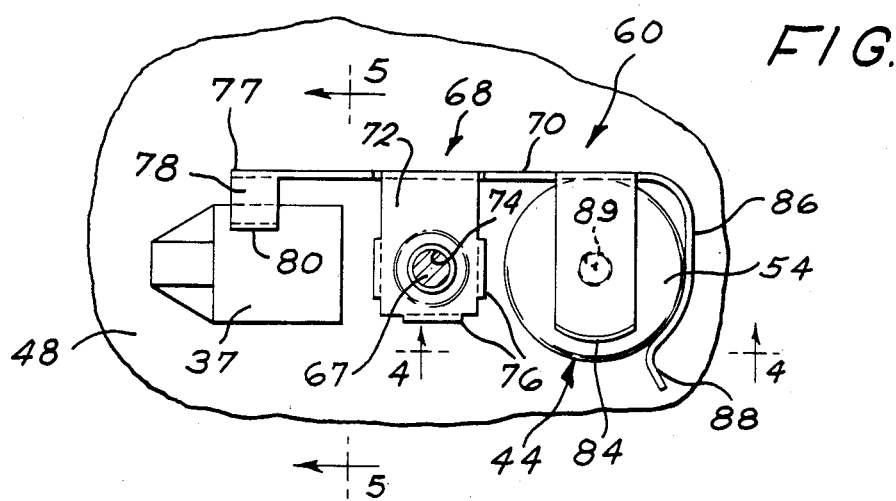
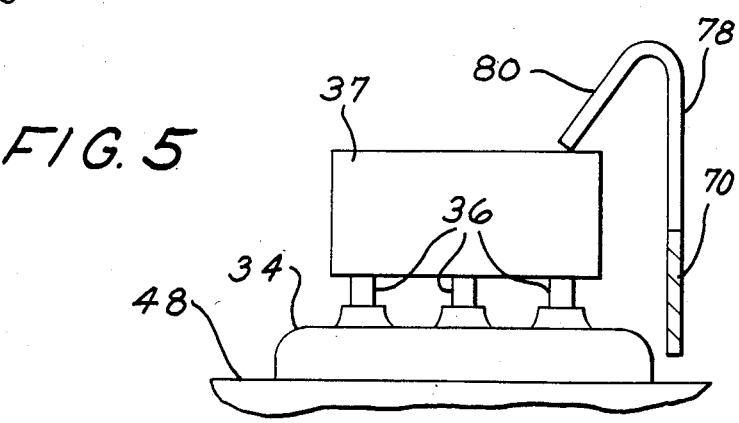

HERMETIC COMPRESSOR INCLUDING A TERMINAL BLOCK AND THERMAL PROTECTION RETAINER MEANS

BACKGROUND OF THE INVENTION

This invention relates to a hermetic motor compressor and more particularly to a retaining system for removably securing the motor overload protector and terminal receptacle block assembly relative to the compressor casing.

Current terminal assemblies for making electrical connections to the motor component of a hermetic motor compressor unit includes a terminal connector having a plurality of conductor pins projecting through spaced apertures in a cup-shaped metal body member. The cup-shaped metallic body member is adapted to be inserted in an opening in the hermetic casing and secured thereto. A terminal block assembly is plugged in over the conductor pins of the terminal connector. During operation of the compressor motor the vibrations caused by compressor operation may in some instances cause the terminal assembly to become disengaged from the conductor pins causing de-energization of the compressor. In other instances the terminal assembly may be inadvertently moved relative to the conductor pins when the compressor is serviced. A method of solving this problem is to provide some sort of mechanical fastening device between the terminal block and terminal pin assembly.

It is also desirable, in hermetic motor compressors, to provide a thermal protection device which stops the compressor when the temperature within the case approaches the degree which could damage the insulation of the motor windings. In many of the present day refrigerant compressors the thermal protectors are mounted within the sealed hermetic case. While this arrangement is effective in sensing motor temperatures, it, however, causes some problems when the protector itself malfunctions. This results in the entire compressor being discarded since in most instances it is not practical to disassemble a hermetic compressor assembly to repair its internal parts. One solution to this problem is to mount the thermal protection device externally. In this instance a mechanical fastening means must be provided which insures that the thermal protection device remain in intimate contact with the compressor casing.

SUMMARY OF THE INVENTION

It is an object of the present invention to provide a retaining system which will cause the terminal block assembly to remain in electrical engagement with the compressor conductor pins and also insure that the compressor thermal protector is intimately held against the compressor casing.

Another object of the invention is to provide a retaining system which securely holds the terminal block assembly and thermal protector securely relative to the compressor casing while at the same time allowing their removal from their associated position on the compressor casing.

By the present invention there is provided a hermetic motor compressor including a resilient retainer member adapted to removably secure a terminal receptacle block assembly and a thermal protector relative to the compressor. An electric terminal is disposed in an opening formed in the top wall of the compressor. Conductor pins are arranged in the terminal including end portions projecting outwardly from the casing. The terminal receptacle block assembly includes female terminals arranged to receive the conductor pins of the electric terminal. The thermal protector includes a base wall dimensioned to conform to the casing upper wall.

The terminal receptacle block assembly and thermal overload are removably secured relative to the casing by a spring clamp formed of stiffly flexible metal stock having end portions adapted to engage the terminal block assembly and thermal overload. The clamp is provided with a central opening dimensioned to receive a stud member secured to the upper wall of the compressor casing. A retainer member on one end portion of the clamp is adapted to engage the upper wall of the thermal protector, while a retaining means on the other end portion of the clamp is dimensioned to engage the terminal receptacle block assembly. A post member threadably engages the stud member for applying pressure on the central portion of the clamp. The downward pressure on the clamp causes its end portions to forceably engage the terminal block and thermal protector to removably secure the terminal block assembly relative to the conductor pins and for removably securing the thermal overload relative to the compressor upper wall.

DESCRIPTION OF THE DRAWINGS

FIG. 3 is a plan view taken along line 3—3 of FIG. 1;

FIG. 4 is an enlarged sectional view taken along line 4—4 of FIG. 3; and

FIG. 5 is a sectional view taken along line 5—5 of FIG. 3.

DESCRIPTION OF THE PREFERRED EMBODIMENT

Figure 1:
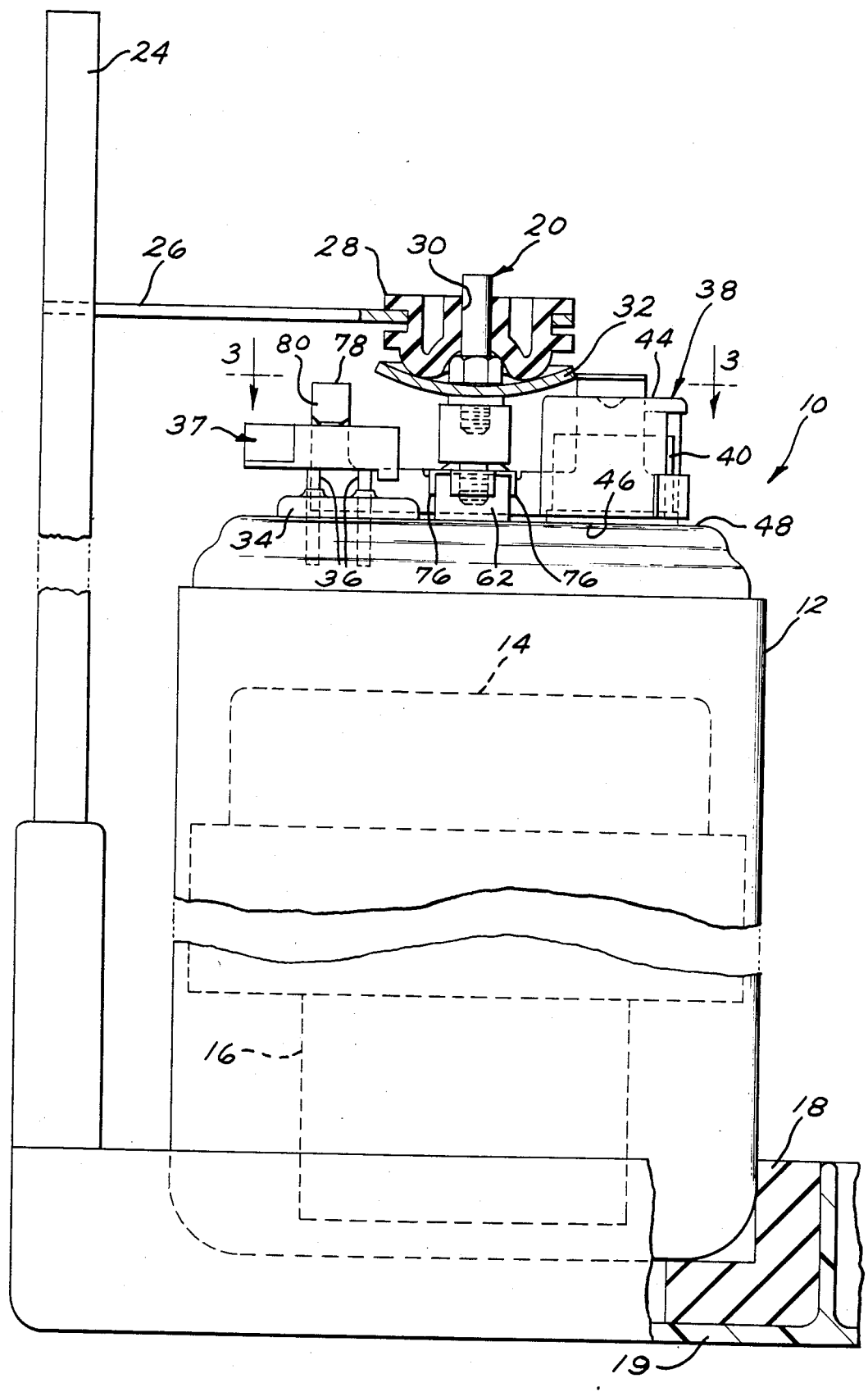
FIG. 1 is an elevational view of a hermetic motor compressor incorporating the preferred embodiment of the present terminal block and thermal protection retainer means.

Referring now to the drawings, wherein a preferred embodiment of the invention has been shown and particularly to FIG. 1, the basic components of the refrigerant hermetic motor compressor assembly 10 are of conventional construction and include an outer casing 12 housing a motor compressor unit comprising an upper motor section 14 and a lower compressor section 16. As shown in FIG. 1 the compressor casing 12 is mounted in its vertical position. The casing 12 of the compressor is arranged with its lower portion located in a resilient mounting member 18 which is positioned on the support or base wall 19. To insure the vertical stability of the compressor casing 12 means are provided to support the casing at its upper end. To this end the compressor is provided with a stud 20 extending upwardly from and secured to the upper wall 22 of the compressor casing 12. A support structure is provided which includes a post 24 supported on the base 19 in a vertical position. A cantilevered arm 26 extends perpendicular to the vertical post 24 to a position where it overlies the compressor and more particularly the stud 20. Located on the arm 26 is a resilient grommet 28 having an opening 30 which axially aligns with the stud 20. The grommet 28 is dimensioned to seat in a convex side of a disk-shaped member 32 which as will be explained later is secured to the stud 20. With the compressor in its installed or operating position the stud 20 is arranged in its cooperating opening 30 of grommet 28 to thereby stabilize the vertical axis of the compressor.

In order to electrically connect the motor 14 to an electrical power source there is provided a connector consisting of an inverted cup-shaped terminal connector 34 mounted directly to the top wall 22 of the casing 12. The terminal connector 34 in connection with the present invention is provided with a plurality of conductor pins 36. The conductor pins 36 are positioned to project through the terminal 34 in both directions. The inner projecting ends of conductor pins 36 located in the casing are connected to the motor 14 in any suitable manner (not shown). The outer projecting ends of conductor pins 36 receive a terminal or receptacle block assembly 37 which includes female connector (not shown) adapted to be plugged into engagement with the conductor pins 36.

Figure 2:
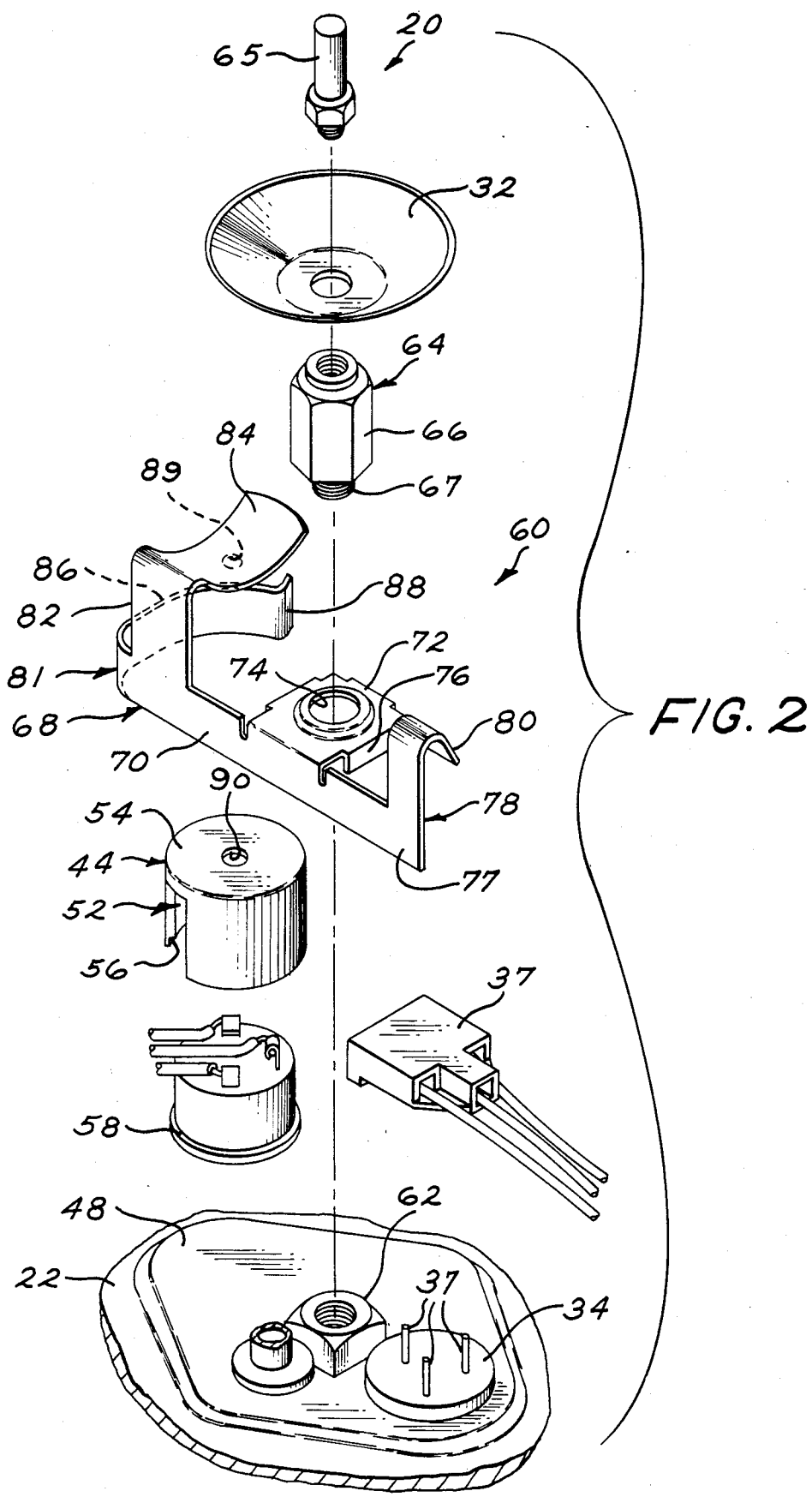
FIG. 2 is an exploded perspective drawing showing the various cooperating elements incorporated in the present retainer system.

In order to provide thermal protection for the motor 14 within the casing 12 there is provided a thermal overload protection assembly 38 including an inverted inner cup-shaped housing 40 in which a thermal responsive switch 42 (FIG. 4) is arranged and an outer cover 44. The switch 42 is designed to break the current to the compressor motor whenever a predetermined high temperature is sensed. This thermal protector may be of any well-known type which is adapted to open a switch upon sensing a predetermined high temperature. The lower circumferentially disposed edge portion 46 of cover 44 is in a substantially flat plane which serves to maintain it in intimate contact with a flat wall portion 48 (FIG. 2) formed in the upper wall 22 of the casing. As shown best in FIG. 4 when the lower edge portion 46 of cover 44 is positioned on flat wall portion 48 the switch 42 is in effect positioned in a pocket 50 containing air which is exposed directly to the temperature of portion 48 of the wall 22. It is important therefore that the edge portion 46 remain in intimate contact with wall portion 48 since ambient air entering the pocket 50 will affect the temperature sensed by the thermal switch 42. The outer cup-shaped cover 44 of protector assembly 38 substantially surrounds the side and top walls of the inner housing 40. The cover 44 as shown in FIG. 2 is provided with an opening 52 through which electrical connection is made to the switch 42 and a top wall 54. The cover 44 is provided with an inner circumferentially disposed ledge 56 (FIG. 2) which engages an outer circumferentially disposed shoulder 58 on the side wall adjacent the lower edge 46 of housing 40. A downward force on cover 44 will be transferred through the ledge 56 and shoulder 58 to the circumferentially edge portion 46 to insure its intimate contact with wall portion 48.

By the present invention a retaining assembly 60 is provided for removably securing the thermal overload protector assembly 38 relative to the surface 48 and receptacle block 37 relative to the conductor pins 36 of the connector 34 respectively as they are arranged on the compressor casing. The retaining assembly 60 employs the upper compressor mounting stud 20 as an integral part. To this end as shown in FIGS. 1-3 there is secured to the wall portion 48 of the compressor a center post 62 having a plurality of flat side walls. The mounting stud 20 includes an intermediate removable threaded post member 64 and a removable threaded upper end member 65. The removable post member 64 includes an enlarged nut-like portion 66 having a depending male bolt portion 67 which threadably engages the threaded female upper end of the center post 62. The member 32 is secured between the post member 64 and end member 65. A spring clamp or retainer member 68 made of relatively stiff resilient material is adapted to be mounted on the center post 62 and secured thereto by post member 64. In this position the retainer member 68 is adapted to securely engage both the thermal protector 38 and receptacle block assembly 37 as will now be fully described.

The retainer member 68 in the embodiment shown is formed from a single piece of spring steel including a substantially vertically oriented body member 70. Extending from the central area of body member 70 is a horizontally positioned central locating portion 72 which includes an opening 74 for receiving the threaded portion 67 of member 64. Extending downwardly from portion 72 are wall members 76 which are dimensioned to engage the flat side walls of center post 62. The engagement between wall members 76 and the flat side wall portions of the center post 62 serve to accurately position the assembly 60 and to prevent rotation of member 68 relative to the compressor during installation thereof. The area of portion 72 surrounding opening 74 is raised so as to form a locking washer arrangement for securely holding retainer member 68 and for preventing rotational movement of the post 64 relative to post 62. Formed on one end portion 77 of the member 68 is a vertically extending terminal block holding member 78 which includes a downwardly projecting holding portion 80. As best shown in FIGS. 1, 3 and 5 with the member 68 secured to the post 62 the downwardly projecting portion 80 of member 78 engages the upper wall of the receptacle block assembly 37. The member 78 is dimensioned so that when member 68 is secured to the post 62 as described above the portion 80 is biased downwardly against the assembly 37 to insure engagement between the assembly 37 and connector pins 36.

The other end portion 81 of the member 68 includes a portion 86 (FIG. 2 and 3) extending substantially perpendicular to the body portion 70 and an inwardly extending end portion 88 which is dimensioned to engage the side walls of the thermal protector cover member 44, as shown in FIG. 3.

Formed adjacent the end portion 81 of member 68 is vertically extending thermal protector holding member 82 which has formed at its upper end an arcuate horizontally extending holding member 84. The arcuate holding member 84 is dimensioned so that when member 68 is secured to the post 62 as described above the portion 84 is biased downwardly against the upper wall 54 of the thermal protector cover member 44 to insure engagement between edge 46 and wall 48. The central portion of arcuate portion 84 is provided with a downwardly projecting dimple 89 which is dimensioned to engage a depression 90 in the upper wall 54 of cover member 44. This arrangement serves to lock the member 44 relative to the number 68 and give axial stability to the thermal protector.

While an arrangement has been provided for securely holding the terminal block assembly and motor protector relative to the compressor casing 12 it should be noted that due to the flexibility of the retainer member 68, it is possible in this present arrangement to remove the thermal protector assembly 38 and terminal receptacle block assembly 37 without disassembling or removing the retainer member 68 from the stud 20. Further, it should be noted that the retainer member 68 may be installed on the stud 20 as described above prior to the installation of the receptacle block assembly 37 on conductor pins 36 and also prior to positioning the protector assembly 38 on the flat wall portion 48. This allows placement of these components in their installed positions without the use of tools or other devices since the clamp 68 is yieldable under normal hand pressure by an ordinary installer.

It should be apparent to those skilled in the art that the embodiment described heretofore is considered to be the presently preferred form of this invention. In accordance with the Patent Statues, changes may be made in the disclosed apparatus and the manner in which it is used without actually departing from the true spirit and scope of this invention.

What is claimed is:

1. A hermetic compressor including a casing having a side wall, a lower wall, and an upper wall provided with an opening and a vertically extending stud member secured to said upper wall;

an electric terminal disposed in said opening;

conductor pins arranged in said terminal including end portions projecting outwardly from said casing;

a terminal receptacle block assembly having female terminals arranged to receive said end portion of said conductor pins;

a thermal overload protector including a base wall dimensioned to conform to said casing upper wall and an upper wall having a central depression;

a retainer arrangement removably securing said terminal receptacle relative to said electric terminal and said thermal overload protector relative to said casing upper wall comprising:

a resilient retainer means formed of stiffly flexible metal stock including an opening receiving said stud member, a first leg portion extending outwardly from a central opening including an arcuate member engaging the side walls of said thermal overload protector and a retainer member engaging said upper wall of said thermal overload, a second leg portion extending outwardly from said central opening including retaining means engaging the upper end of said terminal receptacle block;

a post member threadably engaging said stud member including an enlargement dimensioned for applying pressure on said retainer means to cause said retaining member and said retaining means of said leg portions to forceably engage said terminal block and said thermal overload protector to removably secure said terminal receptacle block assembly relative to said conductor pins and removably securing said thermal overload relative to said compressor upper wall.

2. The invention recited in claim 1 wherein said stud member further includes a center post secured to said casing upper wall having a shoulder supporting said retainer means and a neck portion received in an elongated central opening, whereby said retainer member is secured between said shoulder and said enlargement and movable through said elongated central opening for laterally positioning said resilient retainer means relative to said overload protector and said receptacle block assembly.

3. The invention recited in claim 2 wherein said thermal overload protector includes an inverted cup-shaped housing having its lower peripheral edge portions in a substantially flat plane.

4. The invention recited in claim 3 wherein said casing upper wall includes a substantially flat portion receiving said lower peripheral edge portion of said thermal overload protector in intimate contact therewith.

5. The invention recited in claim 1 wherein said resilient retainer means further includes a horizontally positioned locating portion in which said opening is located.

6. The invention recited in claim 5 wherein said resilient retainer means further includes wall portions on said horizontally positioned locating portion engaging said stud member for preventing rotation of said resilient retainer means relative to said casing.

7. The invention recited in claim 6 further including means associated with said opening for preventing rotation of said post member and said retainer relative to said stud member.

* * * * *

UNITED STATES PATENT AND TRADEMARK OFFICE
CERTIFICATE OF CORRECTION

PATENT NO. : 4,571,517

DATED : February 18, 1986

INVENTOR(S) : Gary L. Chastine

It is certified that error appears in the above-identified patent and that said Letters Patent is hereby corrected as shown below:

Claim 1, Column 5, line 41, after "overload" insert --protector--.

Signed and Sealed this

Tenth Day of June 1986

[SEAL]

Attest:

DONALD J. QUIGG

Attesting Officer

Commissioner of Patents and Trademarks